C. E. GIDDINGS, Jr., DEC'D.
A. S. GIDDINGS, ADMINISTRATRIX.
VALVE REMOVING TOOL.
APPLICATION FILED OCT. 23, 1920.

1,433,131.  Patented Oct. 24, 1922.

WITNESSES
J. Herbert Bradley
Lois Wineman

INVENTOR
Charles E. Giddings, Jr.
by Clarke & Doolittle
his attorneys

Patented Oct. 24, 1922.

1,433,131

UNITED STATES PATENT OFFICE.

CHARLES E. GIDDINGS, JR., OF PITTSBURGH, PENNSYLVANIA, ASSIGNOR TO HOWARD G. HAMMER, TRUSTEE.

VALVE-REMOVING TOOL.

Application filed October 23, 1920. Serial No. 419,065.

*To all whom it may concern:*

Be it known that I, CHARLES E. GIDDINGS, Jr., a citizen of the United States, residing at Pittsburgh, in the county of Allegheny and State of Pennsylvania, have invented certain new and useful Improvements in Valve-Removing Tools, of which the following is a specification.

My invention relates to a valve removing tool for removing valves from the "valve in head" type of internal combustion engine.

In certain well known types of internal combustion engines, the valves and valve seats or cages are placed in the head of the cylinder as a unit. When it is desirable to remove the valve, the valve cage is also generally removed. The valve cages are tightly fitted in the cylinder heads, and after the engine has been run and they have been subjected to heat and gases, the difficulty of removing them is increased. The usual way of removing them heretofore has been to insert a forked end of a lever several feet in length and formed from good carbon steel around the valve stem and to provide a fulcrum beneath the lever between its ends. By pressing down on the free end of the lever, the valve and its cage could be lifted out, but such action usually resulted in breaking a spring or bending a valve stem.

It is the primary object of the present invention to provide a valve removing tool for valves of this kind in which a direct vertical pull may be applied to the valve stem.

According to my invention, I provide a sleeve or other suitable member rotatably secured to the end of a threaded shaft, to the upper end of which shaft is secured a crank or other suitable operating means. Threaded on the shaft is a suitable nut adapted to engage against a supporting member, such as an outer sleeve. A suitable fastening means is provided for connecting the valve spring with the inner sleeve. Upon turning the crank in the proper direction, the valve and its seat may be lifted vertically.

My invention may be more fully understood by reference to the accompanying drawings, in which,—

Figure 1:
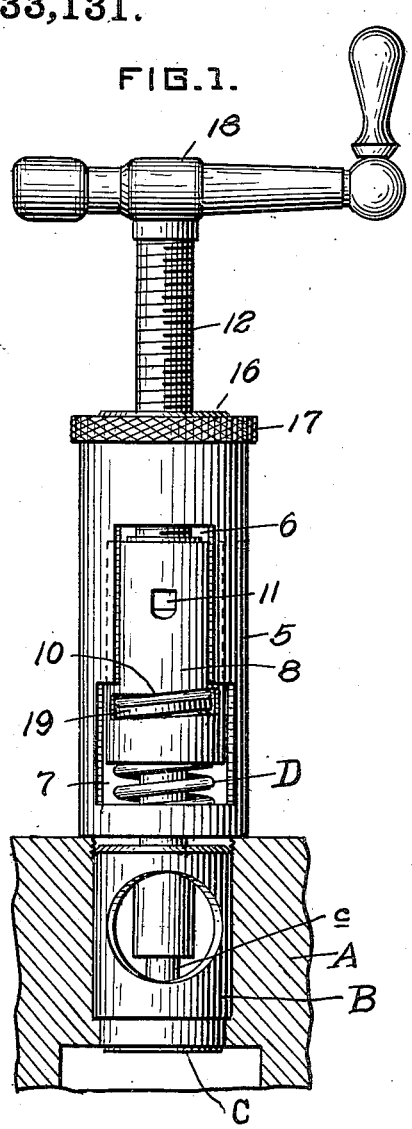
Fig. 1 is a side elevation of my invention applied to a valve.
Figure 2:
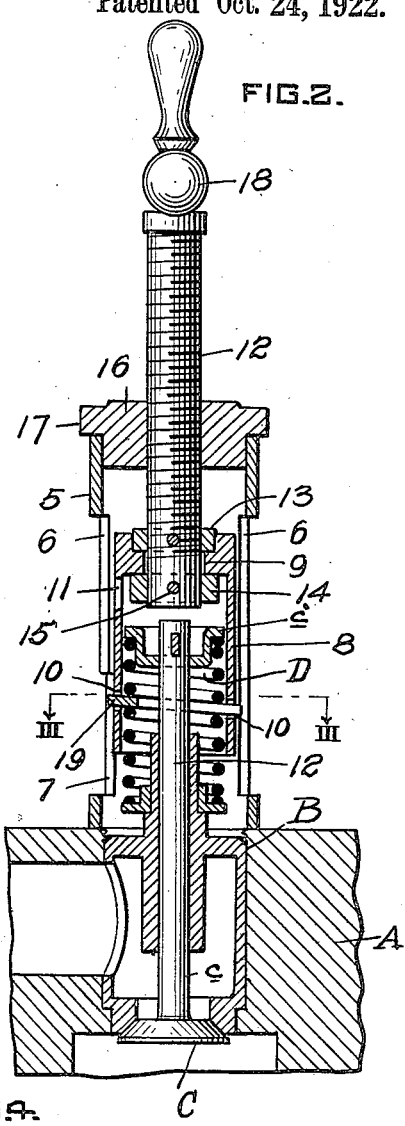
Fig. 2 is a vertical transverse section along the center of Fig. 1.

In the drawings, A represents the cylinder head of an internal combustion engine. B represents a valve cage which is tightly fitted in a socket in the cylinder head and which is normally held in position by a ring nut, not shown. C is the valve, having a stem $c$, an end cap $c'$, and a compression spring D.

My invention includes a nut supporting member of any suitable construction but preferably made in the form of a cylinder 5 having a diameter greater than the diameter of the valve socket in the cylinder head. Slots or openings 6 are formed in opposite sides of the cylinder, the lower portions of the slots being enlarged at 7 for a purpose hereinafter stated. A sleeve 8 having an external diameter less than the internal diameter of the cylinder is arranged within the cylinder and has its upper end connected by a swivel joint with the lower end of the threaded rod 12 passing through the nut 16 which is supported during the operation of the tool by the supporting member or cylinder 5. The swivel joint consists of discs 13 and 14 arranged on opposite sides of the end wall of the sleeve 8 and secured to the threaded rod. The sleeve is made of such an internal diameter relative to the external diameter of the coils of the spring D that when the shell or sleeve 8 has been slipped down along the spring, adjacent coils within the cylinder are held in alinement and will not be forced out of line when the spring is compressed. The shell is provided adjacent to its lower end with oppositely disposed slots to permit of the insertion of the clip 19, which passes between adjacent coils, and its ends rest on the bottom walls of the slots 10 for placing the clip 19 in position. This clip when in position, rests at points adjacent to its ends in the slots 10 in the sleeve 8 while the portion intermediate the ends lies between adjacent coils of the spring. The clip is slotted for the reception of the stem C of the valve. As shown, the clips are bent to correspond to the inclination of the coils to the axis of the spring and the slots 10 in the sleeve are correspondingly inclined. This inclination ensures a uniform bearing of the clip on the adjacent coil, thus avoiding any tendency to force the coils out of line.

It is characteristic of the improvement herein that the sleeve will so closely hug the spring of the valve mechanism as to prevent any movement of the individual coils relative to adjacent coils whereby the spring when compressed will become in effect a cylindrical body, one end of which will rest upon the clip while the other end bears uniformly against the washer of the upper end of the valve stem, and such upper end is closely adjacent to the stem itself so that there is little liability of any distortion of the washer by removing the valve.

Threaded on the shaft 12 is a nut 16 having a projecting knurled flange 17 adapted to engage the end of the supporting cylinder 5. The upper end of the shaft 12 is squared and provided with an operating means, such as a crank 18.

Figure 3:
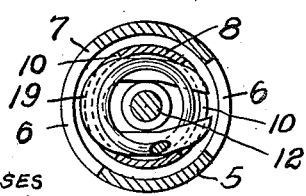
Fig. 3 is a horizontal section on line 3—3 of Fig. 2.
Figure 4:
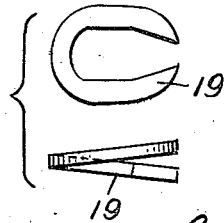
Fig. 4 shows in detail the top and side of the clip I employ for connecting the lifting element with the valve spring.

For connecting the valve engaging sleeve 8 with the valve spring D, I provide removable bifurcated clips 19 formed from flat pieces of metal, as shown in detail in Fig. 4. One of these clips is slipped into engagement with the spring D through the slots 10, the ends of the clip resting against the edges of the slots (see Fig 3). The slots 10 are preferably positioned in such manner as to correspond substantially to the helical inclination of the convolutions of the spring, and the clips are also preferably bent to correspond to this inclination. The metal of which the clips are formed is preferably resilient to a certain degree.

In use, the supporting sleeve 5 is placed over the projecting portions of the valve, the lower end of the sleeve resting on the cylinder head, the other portions of the device being at that time entirely removed. The nut 16 is threaded to a position relatively high up toward the crank 18, and the inner sleeve 8 is inserted within the outer cylinder and forced over the spring until it is sufficiently far down thereon. A clip 19 is then forced into position, the enlarged opening in the outer sleeve at 7 facilitating the insertion. The nut 16 is then threaded down until it is tight against the upper edge of the supporting sleeve, which is the position shown in the drawings. The crank 18 may then be turned in the proper direction. The friction of the nut 16 against the sleeve holds it from turning, and an upward motion is transmitted to the spring engaging member 8. This upward motion is transmitted through clip 19 to the spring D, washer $c'$, valve stem $c$, and valve C, and the valve and case B are forced upwardly.

By providing a very gradual pitch to the threads on the shaft 12, a considerable lifting power can be obtained. Once the valve is well loosened, it may be lifted out. By the use of a suitable tool, such as a screwdriver, the clip 19 can be quickly withdrawn to disengage the spring.

It is obvious that various changes could be made in the construction of the device without varying from the principle of my invention, and that by slight changes in construction, the device could be made to pull other elements than valves. I do not limit myself to the application of the tool as a valve removing tool only.

I claim as my invention:—

1. A valve removing tool comprising a supporting member, a valve pulling member, a threaded shaft rotatably connected with the valve pulling member, threaded means for engaging the shaft to impart a vertical movement to the valve pulling member and removable means adapted to simultaneously engage the pulling member and some portion of the valve mechanism.

2. A valve removing tool comprising a supporting member, a valve pulling member comprising a slotted sleeve adapted to embrace a portion of the valve mechanism, a threaded shaft having a swivel connection to the sleeve, threaded means for engaging the shaft to impart vertical movement to the valve pulling member, and means removably inserted in the slotted sleeve and engaging a portion of the valve mechanism.

3. A valve removing tool comprising the supporting member, a valve pulling member comprising a slotted sleeve adapted to embrace a portion of the valve mechanism, a threaded shaft having a swivel connection with the sleeve, threaded means engaging the shaft and means comprising a removable clip adapted to be inserted through the slotted sleeve and engage a portion of the valve mechanism.

4. A tool for removing valves, the kind wherein a spring is provided in the valve structure comprising a supporting member, a valve pulling member comprising a slotted sleeve adapted to embrace the spring of the valve and prevent any relative movement of the coils comprising the valve, the slots in the sleeve being positioned to conform substantially to the helical inclination of the sleeve, a threaded shaft rotatably connected to the valve pulling member, a threaded means for engaging the shaft and a clip removably inserted through the slotted sleeve and extending transversely of the spring in a plane intermediate the ends of the spring.

5. A valve lifting tool comprising a valve pulling member adapted to embrace the valve spring and maintain the several coils in alinement, clips for connecting the valve pulling means with the valve spring in a plane intermediate the ends of the spring and means for moving the valve pulling means longitudinally.

6. A valve removing tool having in combination a sleeve adapted to enclose the spring of the valve mechanism and hold the coils thereof in alinement, means for connecting the sleeve to the spring, a supporting frame adapted to be supported by the cylinder head carrying the valve, and means carried by said support for shifting the said sleeve.

7. A valve removing tool having in combination a frame, a sleeve movable in the frame and adapted to enclose the spring of the valve mechanism, a threaded rod rotatably connected to the sleeve, a nut for said rod supported by the frame and a clip adapted to be arranged transversely of the sleeve and pressed between adjacent coils of the spring.

8. A valve assembly remover of the class described comprising an open ended casing adapted to fit at its open lower end on a cylinder head, said casing having diametrically opposed slots in its opposite sides, an inner shell freely suspended within said casing having slots registering with the slots of the casing, means for suspending and raising said inner shell about a valve assembly and a fork for straddling the valve stem of the assembly and engaging the valve spring thereof when the inner shell is raised with respect to the casing.

9. A valve assembly remover of the class described comprising an open ended, tubular facing adapted to fit on a cylinder head, said casing having longitudinally extending, enlarged opposed slots in the sides thereof, an inner shell freely suspended from the top and within said casing having enlarged slots in its opposite sides for registration with the slots of the casing, rotatable means for suspending and raising said inner shell about a valve assembly and a fork adapted to be inserted through the slots of the casing and inner shell to straddle the valve stem and engage the valve spring of the assembly when the inner shell is raised with respect to the casing.

10. A valve assembly remover of the class described comprising an open ended tubular casing adapted to fit on a cylinder head, said casing having longitudinally extending, enlarged opposed slots in the sides thereof, an inner shell freely suspended from the top and within said casing, having enlarged slots in its opposite sides for registration with the slots of the casing, a screw jack connected to the top of said inner shell and extending through the top of the casing whereby the shell may be lowered and suspended over a valve assembly and a flat fork adapted to be inserted through the respective slots in the said casing and shell to straddle the upper portion of a valve stem and engage the valve spring of the assembly when the screw jack is raised.

In testimony whereof I affix my signature in presence of two witnesses.

CHARLES E. GIDDINGS, Jr.

Witnesses:
  Wm. H. Parmelee,
  Lois Wineman.